Figure 1:
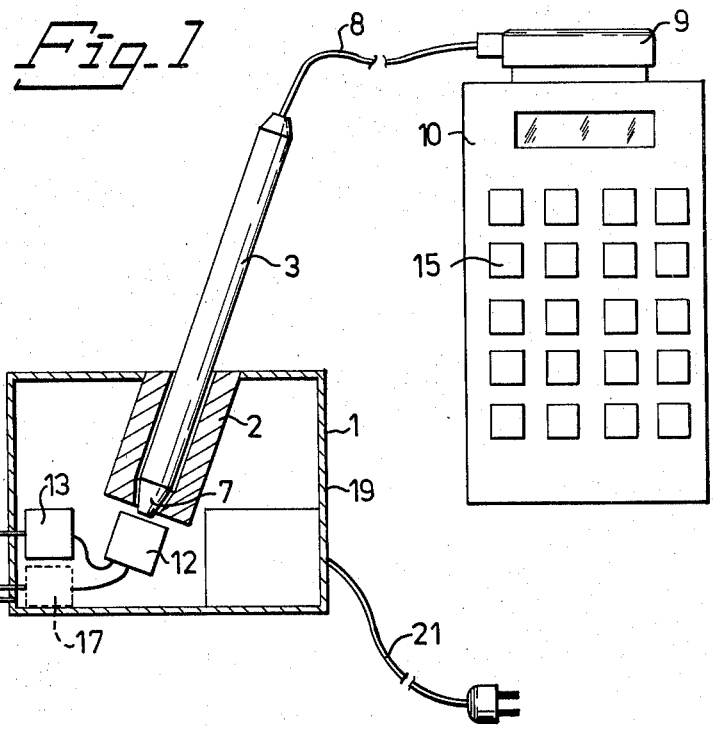

United States Patent [19]
Jacobsen

[11] 4,423,319
[45] Dec. 27, 1983

[54] COMMUNICATION LINK

[75] Inventor: Hans Jacobsen, Täby, Sweden

[73] Assignee: Micronic AB, Täby, Sweden

[21] Appl. No.: 224,842

[22] Filed: Jan. 13, 1981

[51] Int. Cl.$^3$ .............................................. G06K 7/10
[52] U.S. Cl. .................................. 235/472; 235/381;
235/487; 235/419
[58] Field of Search .............. 235/419, 472, 381, 487;
455/602

[56] References Cited

U.S. PATENT DOCUMENTS

| | | | |
|---|---|---|---|
| 4,120,452 | 10/1978 | Kimura | 235/381 |
| 4,179,064 | 12/1979 | Yoshioka | 235/381 |
| 4,282,604 | 8/1981 | Jefferson | 455/602 |

FOREIGN PATENT DOCUMENTS 52-63623  5/1977  Japan ................................. 235/472

*Primary Examiner*—Harold I. Pitts
*Attorney, Agent, or Firm*—LeBlanc, Nolan, Shur & Nies

[57] ABSTRACT

A communication link for transferring information from a data terminal with connected light pen (3), which includes a light diode (4) and a phototransistor (5) or corresponding means, to a greater computer unit.

According to the invention, the communication link (1) includes an information transferring device, which according to a first embodiment comprises a phototransistor (11). The light pen (3) is arranged so as by means of its light diode (4) to emit light corresponding to information stored in the data terminal (10), which information is converted via the phototransistor (11) to electric signals and transferred to the greater computer unit.

According to a second embodiment, the information transferring device also includes a light diode (16), which is arranged so as to emit light pulses corresponding to instructions to the data terminal (10) arriving from a greater computer unit. The phototransistor (5) of the light pen (3) is arranged so as to convert said last mentioned pulses to electric signals and to transfer the same to the data terminal (10).

2 Claims, 3 Drawing Figures

COMMUNICATION LINK

This invention relates to a communication link, which is intended to be used in connection with a so-called light pen for reading known areas on price tags and/or goods etc. where, for example, information on the type and/or price etc. of goods is stored in the form of parallel lines spaced differently and/or having different thickness.

Such a light pen normally is used for inventory and similar purposes together with a portable data terminal of known type, which comprises a microcomputer with memories and a keyboard for storing information in the memory as well as for giving instructions to the microcomputer.

For operation, a light pen is connected to the input and output contact of the data terminal, whereafter the pen is moved across said area. The information in said area is thereby stored in the memory of the data terminal. When a number, often a great number of information pieces have been stored, the memory of the data terminal must be emptied of its content into a greater computer unit. The light pen then is disconnected from the data terminal, which is connected via its input and output contact to the greater computer unit, and an instruction is given to the data terminal via its keyboard to empty its memory.

These frequently recurring operations not only are time-consuming, but also involve the great problem, that said input and output contact, which is of multipolar type, rapidly gets worn and thereby gives rise to loose contacts and errors on certain of the inputs and outputs.

It was also found that a person when walking about and scanning goods in the way described often is charged to high static voltage. When then a cable from the greater computer unit is connected to the data terminal, discharge can occur at the inputs and outputs of the data terminal and thereby disturb the program routine of the data terminal. As a result thereof, incorrect information or none information at all is transferred to the greater computer unit.

The present invention eliminates entirely the aforesaid shortcomings.

The present invention is particularly favourable when, after the scanning of a number of goods, the data terminal is out of operation for a certain time and thereafter goods etc. are scanned again.

The present invention, thus, relates to a communication link for information transfer from a data terminal, with connected light pen comprising a light diode and phototransistor or corresponding means, to a greater computer unit.

The invention is substantially characterized, in that the communication link includes an information transfer device, which comprises a phototransistor or corresponding means, which is intended to be connected via an amplifier to a greater computer unit or memory unit, and which is so located at a holder for a light pen that, when a light pen is inserted in the holder, said holder is located close to the point end of the pen, and that the data terminal and the light pen are capable to emit light pulses corresponding to information stored in the data terminal by means of the light diode of the pen, which pulses are intended to actuate the phototransistor for transferring the pulses further to the greater computer unit by electric signals.

Figure 2:
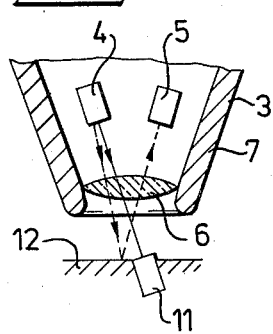
Figure 3:
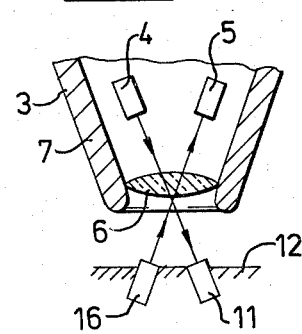

The invention is described in the following, with reference to the accompanying drawing, in which FIG. 1 is a schematic sectional view through a device according to the invention, a light pen and a portable data terminal, FIG. 2 shows schematically the point end of a light pen on an enlarged scale and an embodiment of the device according to the invention, FIG. 3 shows the point end of a light pen on an enlarged scale and a modified embodiment of the device according to the invention.

The device according to the present invention is a communication link 1, which is provided with a tubular inward directed portion 2, down into which a light pen 3 is intended to be inserted. The communication link 1 serves as a pen-holder for said light pen 3.

A light pen 3 of the kind here concerned is provided with a light diode 4 and a phototransistor 5 located behind a lens 6 in the point end 7 of the pen. These units 4,5 often are assembled in one unit designated by HEADS 1000 and marketed by the company Hewett-Packard.

According to one embodiment of such a light pen 3, the pen emits by the light diode 4 at certain intervals a short light pulse. When the pen abuts a support or is close to it, as in the case when reading shall be carried out, the emitted light is reflected against the support and meets the phototransistor 5. Hereby the light diode 4 is keyed by a transistor to light continuously. When there is no reception by the phototransistor 5, the said light pulses are emitted at said time intervals.

The light pen 3 is connected via a cable 8 and a multipolar contact 9 to a portable data terminal 10.

Information from goods etc. is collected, as mentioned above in the introductory portion, in that the point end of the light pen 3 is moved across an area with coded information in the form of lines, in such a manner, that light pulses caught by the phototransistor at reflection against interspaces between said lines constitute the coded information, which is stored in the memory of the data terminal 10.

The information transferring device of the communication link according to a first embodiment of the invention comprises a phototransistor 11, which is located in a unit 12 in the lower end of the tubular portion 2. The phototransistor is intended to be connected to a greater computer unit via an amplifier, a so-called driver 13 and conductor 14.

When according to this first embodiment information stored in the data terminal 10 is transferred to the greater computer unit (not shown), instructions are given in known manner to the data terminal 10 by means of its keyboard 15 that the terminal shall empty its memory from the information stored therein. The conductor 8 is arranged so as to conduct voltage to the light diode 4 in the point end 7 of the pen 3, whereby the binary output signal from the computer is converted to light pulses, which are emitted by the light diode 4. These pulses are received by the phototransistor 11 in the unit 12 which converts the light pulses to corresponding electric pulses, which via the driver 13 are transferred to the greater computer unit.

According to a second embodiment of the invention, the communication link comprises in addition to a phototransistor and driver 11 and, respectively, 13 also a light diode 16 and an amplifier 17, shown by dashed line in FIG. 1, which is capable to amplify signals arriving on a conductor 18 from the greater computer unit and thereby to effect light emission of light pulses from the light diode 16, which light pulses correspond to said lastmentioned signals.

At this embodiment, the greater computer unit is programmed in known manner to instruct emptying of a memory, such as the memory in the data terminal 10. When the pen 3 has been inserted down into the tubular portion 2, the greater computer unit emits said lastmentioned signals, whereby the light diode 16 emits the pulses, which thereafter are converted by the phototransistor 5 of the pen to a signal, which is fed into the data terminal. This signal corresponds to the instructions, which according to the first embodiment described are given via the keyboard 15 of the data terminal. When the instruction has been received, the memory of the data terminal 10 is emptied in the same way as described above for the first embodiment.

When the pen 3 is inserted down into the tubular portion 2, the light diode 4 thereof emits said light pulses at certain time intervals. These pulses can be utilized according to the second embodiment, in that the phototransistor of the unit 12 hereby is activated and emits these pulses to the greater computer unit, which after having received one or several such pulses and at feed-in receptivity into its memory emits instruction signals via the conductor 18 and light diode 16 to the pen 3, and thereby to the data terminal 10, that the data terminal shall transfer stored information.

The light diode 16 and phototransistor 11 of the communication link may also consist of the aforesaid unit HEADS 1000.

The communication link 1 further comprises a casing 19 and a voltage source 20 for supplying voltage to the amplifiers 13, 17. The numeral 21 designates a conductor from the voltage source 20 to the mains, and 22 designates a conductor to earth.

The shortcomings referred to above in the introductory portion are completely eliminated by the present invention.

After some use for reading, the pen 3 is inserted down into the tubular portion 2, whereby the information stored in the memory of the data terminal is transferred to a greater computer unit, without the contact 9 having to be removed and another contact connected to the computer unit having to be put there. The wear in the contact 9, thus, is completely avoided.

Furthermore, between the data terminal and the greater computer unit a galvanically separated connection is obtained and, therefore, the influence of static electricity is eliminated.

A further advantage is the easiness of using the communication link, due to the fact that fewer manipulations than before are required for emptying stored information from the data terminal.

The invention, of course, can be modified substantially, for example by housing microcomputers, memories etc. in the communication link 1, in order to store information intermediately, before it is transferred to the greater computer unit. The communication link also may be battery-driven.

The invention, thus, must not be regarded restricted to the embodiments described above, but can be varied within the scope defined in the attached claims.

I claim:

1. A communication link for transferring information from a data terminal (10), with connected light pen (3) with a point end (7) which includes a light diode (4) and phototransistor (5) or corresponding means, to a greater computer unit, wherein the communication link (1) includes a light pen holder (2) and an information transferring device, which comprises a transfer phototransistor (11) or the like, and an amplifier (13) to which said phototransistor is connected and said amplifier (13) being adapted to be connected to a greater computer unit or memory unit, said transfer phototransistor (11) being located adjacent said holder (2) whereby said transfer phototransistor (11), when a light pen (3) is inserted in said holder (2), is located close to the point end (7) of the light pen (3), and that the data terminal (10) and light pen (3) in a manner known per se emit light pulses, corresponding to information stored in the data terminal (10), by the light diode (4) of the light pen, which pulses are intended to activate said transfer phototransistor (11) for transferring the pulses via said amplifier further to the greater computer unit by electric signals, said communication link being further characterized in that said information transferring device also includes a transfer light diode (16) located adjacent said transfer phototransistor (11), and a second amplifier (17) to which said transfer light diode (16) is connected and said second amplifier (17) being adapted to be connected to a greater computer unit, said transfer light diode (16) emits light pulses corresponding to instructions to the data terminal (10) arriving from the greater computer unit via said amplifier (17), and that the phototransistor (5) of the light pen (3) when the light pen is in said holder (2) is arranged to receive light pulses from said transfer light diode (16) and to transfer such pulses to the data terminal (10) via electric signals, where the data terminal (10) is arranged to receive such instructions.

2. A communication link as defined in claim 1, wherein said light pen holder (2) is a tubular member having an open lower end and adapted to receive the light pen (3) with its point end at the lower end of the holder and said transfer phototransistor (11) and said transfer light diode (16) are located closely adjacent and facing said open lower end.

* * * * *

UNITED STATES PATENT AND TRADEMARK OFFICE
CERTIFICATE OF CORRECTION

PATENT NO. : 4,423,319
DATED : December 27, 1983
INVENTOR(S) : Hans Jacobsen

It is certified that error appears in the above-identified patent and that said Letters Patent is hereby corrected as shown below:

On first page of patent, column 1, insert:

--Foreign Application Priority Data--; and

--Sweden No. 8000402 filed on January 17, 1980--.

Signed and Sealed this

Twenty-ninth Day of May 1984

[SEAL]

Attest:

GERALD J. MOSSINGHOFF

Attesting Officer    Commissioner of Patents and Trademarks